Patented Apr. 22, 1952

UNITED STATES PATENT OFFICE 2,593,406

2,593,406
DYESTUFFS AND METHOD OF MAKING SAME

David A. Berry, Painesville, Ohio, assignor to Diamond Alkali Company, Cleveland, Ohio, a corporation of Delaware No Drawing. Application December 26, 1947, Serial No. 794,098

9 Claims. (Cl. 260—186)

This invention relates to dye compositions and to methods of making the same. More particularly, it relates to heterogeneous dye compositions derived from chlorinated aliphatic hydrocarbons or mixtures of hydrocarbons as obtained from petroleum fractions and the like, and whose molecular weights are within the range of $C_{10}$ to $C_{36}$ hydrocarbons, and to methods of making the same.

By the method of the present invention, high molecular weight hydrocarbons obtained from petroleum fractions and the like are employed in a series of reactions to yield dyestuffs particularly suitable for dyeing animal, vegetable and artificial fibrous materials, of which particularly advantageous examples are cellulose acetate silk, synthetic superpolyamide fibers, wool, and the like. The method of the present invention employs two relatively cheap raw materials in making dyestuffs, namely, chlorine, and hydrocarbons obtained from petroleum refining, which hydrocarbons may, if desired, be pure compounds but are suitably used in the form of mixtures of hydrocarbons comprising distillation fractions, still residues, natural hydrocarbons, and related mixtures of substances. For example, it has been found that a heterogeneous hydrocarbon mixture, such as that contained in ordinary paraffin wax, which mixture contains hydrocarbons varying in molecular weight from those corresponding to $C_{18}$ hydrocarbons up to those corresponding to $C_{36}$ hydrocarbons, is very suitable in the method of the present invention.

It has also been found that when such hydrocarbons are used in the method of the present invention, a heterogeneous dyestuff composition is obtained which, when used in dyeing animal, vegetable, and artificial fibers, such as cellulose acetate, wool, and the like, has the advantageous property of satisfactorily exhausting the dye bath.

The products of the present invention are dyestuffs having a diazotized and coupled component attached to a carbon atom of an aliphatic chain containing from 10 to 36 carbon atoms, said diazotized and coupled component comprising a primary aromatic amine diazotized and coupled with a compound selected from the group consisting of aromatic amines and phenols and their nuclear substitution products, said component being attached directly to said aliphatic chain through a carbon atom of the nucleus of said primary aromatic amine. In the case of employment of amines in the coupling reaction, the amine group becomes available for rediazotization. These dyestuffs may be obtained in accordance with one aspect of the present invention by chlorinating a mixture of aliphatic hydrocarbons, the molecular weights of which correspond to the range of hydrocarbons containing from 10 to 36 carbon atoms, reacting the mixture of chlorohydrocarbons thus obtained with a primary aromatic amine to obtain an aromatic amine bound directly to a carbon atom of the aliphatic chain, diazotizing the reaction product thus obtained, and coupling the diazotized product with a compound selected from the group consisting of aromatic amines and phenols and substitution products thereof, and recovering an azo dyestuff.

The hydrocarbons used as one of the raw materials in the process of the present invention are selected from acyclic hydrocarbons of high molecular weight, such as mineral waxes and petroleum fractions included within the range corresponding to $C_{10}$ to $C_{36}$ hydrocarbons, and may suitably include substances commonly designated as kerosenes, white oils, oils of the lubricating range, olefine containing materials, paraffin waxes, and the like. It is preferred in the method of the present invention, however, to employ those hydrocarbons falling within the range of $C_{18}$ to $C_{36}$ ordinarily found in the fraction known as paraffin wax.

The hydrocarbons within the range indicated above may be chlorinated by various well-known methods forming per se no part of this invention. Thus, chlorination by gaseous elemental chlorine, by addition of hydrogen chloride to double bonds, by treatment with highly chlorinated metallic chlorides, such as antimony and arsenic pentachlorides or other methods, may be used. For reasons of economy, however, it is preferred to employ gaseous elemental chlorine in the process and to have the wax either dissolved in a suitable non-chlorinatable solvent or in a molten condition during the chlorination reaction. The extent to which the chlorination reaction is carried out, i. e. the amount of chemically combined chlorine contained in the final product of chlorination, may be varied over a wide range. For example, a hydrocarbon of the lower molecular weight range, such as a $C_{10}$ to $C_{16}$ hydrocarbon, may be chlorinated to contain from 3 or 4 to 9 or 10 or more chlorine atoms per molecule corresponding to about 30–40% to 60–80% of chemically combined chlorine. In the higher molecular weight ranges of the hydrocarbons, such as the $C_{18}$ to $C_{36}$ hydrocarbons, the number of chlorine atoms per average molecule may be varied from 4 or 5 to as many as 15 to 20, which corresponds to the range 30% to 80% of chemically combined chlorine by weight.

When chlorinating a hydrocarbon of the type indicated above, particularly by the reaction of elemental chlorine with the hydrocarbon, the precise position of the chlorine atoms on the aliphatic chain is not known. Similarly, the position of the diazotized and coupled component attached to the aliphatic chain is unknown. It is, however, known from general considerations of chlorination reactions, particularly when employing gaseous chlorine, that the hydrogen atoms attached to the terminal carbon atoms of an aliphatic chain are less reactive toward chlorine than the hydrogen atoms attached to secondary carbon atoms. Accordingly, in such chlorinations, there will be a predominance of chlorine atoms attached to secondary carbon atoms. The chemical heterogeneity resulting from the chlorination of a mixture of hydrocarbons has been found to be a definite advantage in the manufacture of dyestuffs from such hydrocarbons, in that these dyestuffs show an unusual affinity for fibers to be dyed, such as acetate silk, superpolyamide, wools, and the like, while being derived from inexpensive mixtures which require no expensive fractionation or purification treatments.

In accordance with one method of making the dyes of the present invention, the chlorohydrocarbons obtained by the chlorination of hydrocarbon mixtures may initially be condensed with a primary aromatic amine or an N-substituted amine, which reaction may be carried out in the presence of a catalyst, such as the Friedel-Crafts catalyst, or in certain cases may be carried out in the absence of a catalyst.

The terms "primary aromatic amine" or "N-substituted amine" include aromatic amines of single or multiple ring structure and their substituted derivatives, which may contain one or more substituents on the aromatic nucleus, such as alkyl substituents exemplified by methyl, ethyl, and the like, or other substituents, such as nitro, hydroxyl, halide such as chloride, carboxyl, sulfonic acid or sulfonate, and the like, so long as at least one hydrogen attached to a nuclear carbon is available for replacement in the condensation reaction to make possible the condensation with and attachment to the acyclic structure, as pointed out above.

With respect to the amine portion of the molecule, the nitrogen attached to the aromatic nucleus may bear two hydrogen atoms or the substituents on the nitrogen atom in place of hydrogen should be replaceable by two hydrogen atoms either prior or subsequent to the aforesaid condensation for reasons which appear hereinafter.

Examples of compounds within the above definition suitable for the condensation reaction with the chlorinated materials are the unsubstituted aromatic amines, such as aniline, alpha, and beta-naphthylamine, and the like, or the nuclear substituted derivatives of the aromatic amines, such as ortho, meta, and para nitroaniline, aniline ortho, meta, and para sulfonic acids, anthranilic acid, and the like, or the N-substituted aromatic amines, such as the anilides, particularly acetanilide. Additionally useful is the general class of compounds readily convertible to amines or substituted amines by reduction, specifically, the aromatic nitro compounds, examples of which are nitrobenzene, nitrotoluene, nitrobenzoic acid, nitrophenol, nitroanilines, and the like.

The condensation reaction may be carried out in a manner to permit the substitution of an amine or N-substituted amine, as described above, for each of the chlorine atoms attached to the aliphatic chain, but it is preferred in the method of the present invention to carry out the condensation reaction in a manner which will permit the aliphatic chain to retain at least some of its chemically combined chlorine. Thus, it is usually preferred to carry out the condensation reaction employing relatively mild conditions of temperature and to subject the reactants to such conditions for relatively short periods of time, dependent to some extent upon the amine chosen for condensation with the chlorohydrocarbon and the catalyst used, if any, the reaction in any case being preferably controlled so as to stop the same before all chlorine atoms are replaced in order that only the more reactive and more easily substituted chlorine atoms shall be removed. This last mentioned condition is especially desirably achieved where a high molecular weight hydrocarbon, such as paraffin wax, has been chlorinated to the extent that the aliphatic chain has from 10 to 20 chlorine atoms on the chain.

The amino group attached to the aromatic nucleus, which in turn is attached to the aliphatic chain by the condensation reaction, is diazotized and coupled in a manner ordinarily employed for the particular type of azo derivatives to be obtained. Thus, in the practice of the present invention, it has been found suitable to dissolve the condensed primary amine product in alcohol and to add this alcoholic solution to a mixture of hydrochloric acid and sodium nitrite, while maintaining the reaction mass at a temperature of the order of between 0° C. and about 5° C. The diazonium chloride formed during the diazotization reacts very readily with amines and phenols or their nuclear substitution products employed in the subsequent coupling reaction.

The diazotization reaction mass may then be warmed to about 10° C. and a solution of an aromatic amine or phenol or the nuclear substitution product of one of these compounds dissolved in strong caustic soda solution added to the warmed diazotization reaction mass to couple the diazotized compound therewith. The diazotized and coupled product separates from the solution generally as a precipitate but, depending upon the type of compound with which the diazotized product is coupled, it may also separate as a viscous oil, which is soluble in various common solvents, such as aliphatic alcohols, i. e. methyl alcohol, ketones, i. e. acetone, ethers, i. e., diethyl ether, and the like. The diazotized and coupled product may then be separated from the remainder of the reaction mass by filtration, or in the event that the material is an oil, by employing known methods for the gravity separation of immiscible liquids, there being no preference as to the manner in which the product is separated from the reaction mass.

When coupling is effected with a primary aromatic amine or a N-substituted amine of the type described above, rediazotization and coupling may be effected under conditions comparable to the initial diazotization and coupling to improve or modify depth or shade or color in the ultimately dyed fabric.

Without intending to limit the scope of the present invention but only in order that those skilled in the art may more fully understand the method of carrying the same into effect, the following specific examples are offered:

*Example I*

100 gms. of chlorinated paraffin wax containing 30% of chemically combined chlorine, and 300 gms. of aniline are charged to a round-bottom flask equipped with a stirrer, thermometer, and condenser. The mixture is heated to reflux temperature (194–196° C.) and maintained at this temperature while being vigorously agitated for a period of 8 hours. The reaction mass is then cooled to room temperature and filtered to remove most of the aniline hydrochloride. The precipitate retained on the filter is dark-colored and is washed with diethyl ether in order to remove excess aniline occluded by the precipitate; the ether-washed precipate is then mixed with an aqueous caustic soda solution, and steam distilled. The caustic soda decomposes any aniline hydrochloride present in the precipitate to aniline and the steam distillation removes the aniline thus formed.

The residue from the steam distillation treatment is then separated from the aqueous caustic soda solution and washed and air-dried. 50 gms. of this product is charged to a round-bottom flask fitted with a stirrer, thermometer, and condenser and containing 150 mls. of 35% hydrochloric acid, 50 gms. of sodium nitrite, the contents of the flask having been cooled to 0–5° C. Within about 10 minutes thereafter, there is charged to the flask a solution of 25 gms. of beta-naphthol in 50% sodium hydroxide and the temperature of the reaction mass is allowed to rise to 10–15° C.

A dark red solid separates from the solution and is separated from the supernatant liquid by filtration, and air-dried. This air-dried product is found to be soluble in Turkey-red oil; such a solution, when dispersed in water in accordance with standard dye practice, dyes wool a bright orange with complete exhaustion of the dye bath upon the addition of $H_2SO_4$ thereto. Cellulose acetate silk is likewise dyed a bright orange by the product.

Example II 50 gms. of chlorinated paraffin wax containing 30% of chemically combined chlorine is dissolved in ethyl acetate and combined with 85 gms. of acetanilide, also dissolved in ethyl acetate, and the combined solutions charged to a round-bottom flask equipped with a stirrer, thermometer, and condenser. 5 gms. of aluminum chloride (anhydrous) is mixed with the ingredients in the reaction flask and the whole mass agitated vigorously for a period of about 2 hours, while the temperature is maintained at 25° C. The product of the reaction appears as a precipitate and is separated from the supernatant liquid by filtration and is washed several times with ethyl acetate to remove the excess chlorohydrocarbon. The washed product is then dissolved in ethyl alcohol and a 10% solution of sodium hydroxide in ethyl alcohol is added thereto in order to hydrolyze the acetanilide derivative to the primary amine. The product thus obtained is insoluble in the alcoholic solution and is thrown down as a precipitate, which is separated from the supernatant liquid by filtration. This precipitate is then dissolved in 1200 mls. of a 6.5% solution of hydrochloric acid. The mixture is then cooled to about 5° C. and 50 gms. of sodium nitrite are added; within about 10 minutes thereafter, 25 gms. of beta-naphthol dissolved in 50% caustic soda are added and the temperature of the reaction mass allowed to rise gradually to about 10–15° C. The coupled product, being insoluble in the supernatant liquid, is separated therefrom by filtration. The washed and air-dried product is found to be soluble in Turkey-red oil and when used to dye cellulose acetate silk material in the manner of Example I, imparts thereto a bright orange color with satisfactory exhausting of the dye bath.

Example III 50 gms. of chlorinated paraffin wax containing 60% of chemically combined chlorine and 100 gms. of acetanilide are dissolved in ethyl acetate and charged to a round-bottom flask equipped with a thermometer, stirrer, and condenser; 5 gms. of aluminum chloride (anhydrous) are immediately thereafter added to the mixture. The reaction mass is vigorously stirred for a period of about 4 hours, while heating to a temperature of about 35° C. The product obtained from this reaction is separated from the reaction mass by filtration, washed, and air-dried. The washed and air-dried product is dissolved in ethyl alcohol and added to an alcoholic solution of sodium hydroxide (10%) in order to hydrolyze the acetanilide derivative and provide the primary amine derivative. The hydrolyzate appears as a precipitate, and is separated from the supernatant liquid by filtration and thereafter washed and air-dried. A mixture of 250 mls. of 35% hydrochloric acid, dissolved in one liter of water to which 100 gms. of sodium nitrite have been added, is cooled to 0–5° C. and the hydrolyzate precipitated added thereto. Within about 10 minutes thereafter, 150 gms. of 1-naphthylamine-2-sulfonic acid dissolved in 20% sodium hydroxide is added to the reaction mass. A bright red precipitate is obtained, which is separated from the supernatant liquid by filtration, and is subsequently washed and dried. The washed and dried material is subjected to a second diazotization by substantially the same procedure as that used previously. The reaction product from the second diazotization is coupled by adding sulfanilic acid, in caustic soda solution to the diazotization reaction mass warmed to about 10° C. A dark-colored precipitate is recovered, and when used in the dye bath, imparts to a cellulose acetate material, a color which tends more toward the blue of the visible spectrum than the product of Example II above. It is also to be noted that the dye obtained shows a greater solubility in water than the dye prepared as in Example II above.

Example IV

A procedure identical with that of Example II above, except that salicylic acid was used in place of beta-naphthol in the coupling reaction, results in a yellow dye which stained wool and dyed acetate silk.

Without intending to be limited in any way by theoretical considerations as to the probable course and extent of certain of the chemical reactions underlying the invention, the following exposition is offered in order to provide a basis for certain of the objectives of the invention as well as for the above-described procedures for carrying the same into effect.

The chlorination of the hydrocarbons employed in the present invention in liquid phase with gaseous elemental chlorine, results in the formation of a mixture of substantially all possible chlorohydrocarbons consistent with the degree of chlorine substitution obtained and the particular hydrocarbon or mixture of hydrocarbons subjected to chlorination reaction. Since, as noted heretofore, the positions taken by the chlorine atoms substituted for hydrogen atoms on the carbon chain are not known, it follows that the nuclear condensation of an amine or substituted amine with such chlorohydrocarbons would necessarily result in a heterogeneous mixture of unknown molecular structures, except for the broadest general interpretations of structure.

Also, as noted hereinabove, it is preferred to carry out the condensation reaction in a manner which will result in chlorohydrocarbons retaining at least a part of their chemically combined chlorine.

The heterogeneous molecular structures comprising the dyestuffs of the present invention, including and coupled with the retention of a portion of the chemically combined chlorine of the chlorohydrocarbons therein, are believed together to account, in part at least, for the excellent affinity of these dyestuffs particularly for certain synthetic fibers.

While there have been described in detail certain forms of this invention and specific examples of its practice, the invention is not to be understood as being limited to such examples as it is realized that changes within the scope of the invention are possible, and it is further intended that each step in the following claims shall refer to all equivalent steps for accomplishing the same result in substantially the same or equivalent manner, it being intended to cover this invention broadly in whatever form its principle may be utilized.

What is claimed is:

1. The process for preparing an azo dyestuff which includes the steps of condensing a mixture of chlorinated aliphatic hydrocarbons, having from 10-36 carbon atoms in the molecules thereof and from 3-20 chlorine atoms per molecule, with a substance chosen from the group consisting of primary aromatic amines of the benzene and naphthylene series, to substitute said substance through the aromatic nucleus thereof for at least one and less than all of the equivalents of the chemically combined chlorine of said mixture, diazotizing the amine group and coupling the diazotized product with a compound selected from the group consisting of primary aromatic amines, phenols, primary naphthylamines, and naphthols, and recovering an azo dyestuff 2. The process for preparing an azo dyestuff composition which includes the steps of condensing chlorinated paraffin wax having from 18-36 carbon atoms in the molecules thereof and containing about 30% of chemically combined chlorine, with substantially three times its weight of aniline, to substitute said aniline through a carbon atom of the aromatic nucleus thereof for at least one and less than all of the equivalents of the chemically combined chlorine of said chlorinated wax, diazotizing the reaction product of the condensation reaction, and coupling the diazotized reaction product with beta-naphthol, and recovering the azo dyestuff thus formed.

3. The process for preparing an azo dyestuff composition which includes the steps of condensing chlorinated paraffin wax having from 18-36 carbon atoms in the molecules thereof and containing about 30% of chemically combined chlorine, with substantially 1.7 times its weight of acetanilide, to substitute said acetanilide through a carbon atom of the aromatic nucleus thereof for at least one and less than all of the equivalents of the chemically combined chlorine of said chlorinated wax, hydrolyzing the anilide group to a primary aromatic amine, diazotizing the amine group, coupling the diazotized amine group with beta-naphthol, and recovering the azo dyestuff composition thus formed.

4. The process for preparing an azo dyestuff composition which includes the steps of condensing chlorinated paraffin wax having from 18-36 carbon atoms in the molecules thereof and containing about 60% of chemically combined chlorine, with about twice its weight of acetanilide, to substitute said anilide through a carbon atom of the aromatic nucleus thereof for at least one and less than all of the equivalents of the chemically combined chlorine of said chlorinated wax, hydrolyzing the anilide of the reaction product thus obtained to a primary amine, diazotizing the amine thus formed, coupling the diazotized product with 1-naphthylamine-2-sulfonic acid, subjecting the product thus formed to diazotization, coupling said product of the second diazotization with sulfanilic acid, and recovering the azo dyestuff thus formed.

5. A heterogeneous azo dystuff composition containing compounds in which chlorinated aliphatic chains having from 10-36 carbon atoms and containing at least one and less than 20 chlorine atoms per aliphatic chain are attached direction to aromatic nuclei of azo dyes through an aromatic nuclear carbon atom, said azo dyes consisting essentially of azo groups attached directly to members of the group consisting of benzene and naphthylene nuclei.

6. A heterogeneous dyestuff composition containing compounds in which chlorinated aliphatic chains having from 10-36 carbon atoms and containing at least one and less than 20 chlorine atoms per aliphatic chain are attached directly to aromatic nuclei of azo dyes through an aromatic nuclear carbon atom, said azo dyes having a plurality of —N=N— groups and consisting essentially of —N=N— groups attached directly to members of the group consisting of benzene and naphthylene nuclei.

7. A heterogeneous dyestuff composition in which chlorinated aliphatic chains of chlorinated paraffin wax containing at least one equivalent of chemically combined chlorine but containing less than 30% of chemically combined chlorine are attached directly to azo components consisting essentially of phenyl-azo-naphthol groups through a nuclear carbon atom of the benzene ring of said components.

8. A heterogenous dyestuff composition in which chlorinated aliphatic chains of chlorinated paraffin wax containing at least one equivalent of chemically combined chlorine but containing less than 60% of chemically combined chlorine are attached directly to disazo components, in which an aniline group is diazotized and coupled with 1-naphthylamine-2-sulfonic acid, which is then diazotized and coupled with anthranilic acid, through a nuclear carbon atom of said aniline group.

9. A heterogeneous dyestuff composition in which chlorinated aliphatic chains of chlorinated paraffin wax containing at least one equivalent of chemically combined chlorine but containing less than 30% of chemically combined chlorine are attached directly to azo components consisting essentially of phenyl-azo-salicylic acid groups through a nuclear carbon atom of said group.

DAVID A. BERRY.

REFERENCES CITED

The following references are of record in the file of this patent:

UNITED STATES PATENTS

| Number | Name | Date |
|---|---|---|
| 2,034,668 | Reindel et al. | Mar. 17, 1936 |
| 2,131,712 | Schoeller et al. | Sept. 27, 1938 |
| 2,196,985 | Flett | Apr. 16, 1940 |
| 2,266,413 | Crossley | Dec. 16, 1941 |
| 2,393,652 | Olpin et al. | Jan. 29, 1946 |